United States Patent
Jun et al.

(10) Patent No.: US 11,459,444 B2
(45) Date of Patent: Oct. 4, 2022

(54) INORGANIC COMPOSITE FOR RUBBER REINFORCEMENT, METHOD FOR PREPARING THE SAME, AND RUBBER COMPOSITION FOR TIRES COMPRISING THE SAME

(71) Applicant: LG CHEM, LTD., Seoul (KR)

(72) Inventors: Shin Hee Jun, Daejeon (KR); Ha Na Lee, Daejeon (KR); Kwon Il Choi, Daejeon (KR); Woo Seok Kim, Daejeon (KR); Myounghwan Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 474 days.

(21) Appl. No.: 16/481,775

(22) PCT Filed: Apr. 12, 2018

(86) PCT No.: PCT/KR2018/004298
§ 371 (c)(1),
(2) Date: Jul. 29, 2019

(87) PCT Pub. No.: WO2019/004575
PCT Pub. Date: Jan. 3, 2019

(65) Prior Publication Data
US 2019/0390039 A1 Dec. 26, 2019

(30) Foreign Application Priority Data
Jun. 29, 2017 (KR) .......................... 10-2017-0082777

(51) Int. Cl.
| C08K 3/36 | (2006.01) |
| B60C 1/00 | (2006.01) |
| C09C 1/40 | (2006.01) |
| C08L 53/02 | (2006.01) |
| C08K 3/34 | (2006.01) |

(52) U.S. Cl.
CPC .................. *C08K 3/36* (2013.01); *B60C 1/00* (2013.01); *C08L 53/02* (2013.01); *C09C 1/405* (2013.01); *C01P 2002/02* (2013.01); *C01P 2004/50* (2013.01); *C01P 2004/61* (2013.01); *C01P 2004/64* (2013.01); *C01P 2006/12* (2013.01); *C08K 2003/343* (2013.01); *C08K 2201/005* (2013.01); *C08K 2201/006* (2013.01); *C08K 2201/011* (2013.01)

(58) Field of Classification Search
CPC ...................................................... C08K 3/36
See application file for complete search history.

(56) References Cited

U.S. PATENT DOCUMENTS

| 5,551,975 | A | | 9/1996 | Freeman et al. |
| 5,723,529 | A | * | 3/1998 | Bernard ................ B60C 1/0016 524/492 |
| 6,121,346 | A | | 9/2000 | Visel et al. |
| 6,211,278 | B1 | | 4/2001 | Vanel |
| 7,256,233 | B2 | * | 8/2007 | Simonot .................. B60C 1/00 152/209.1 |
| 8,597,425 | B2 | * | 12/2013 | Stenzel ..................... C08K 3/36 106/481 |
| 9,006,308 | B2 | | 4/2015 | Sebastian et al. |
| 2006/0009564 | A1 | | 1/2006 | Simonot et al. |
| 2010/0273913 | A1 | | 10/2010 | Goodman et al. |
| 2017/0137322 | A1 | | 5/2017 | Seo |

FOREIGN PATENT DOCUMENTS

| EP | 3401359 A1 | 11/2018 |
| JP | 11-060230 A | 3/1999 |
| JP | 11-302450 A | 11/1999 |
| JP | 11322325 A | 11/1999 |
| JP | 11335494 A | 12/1999 |
| JP | 2006-510766 A | 3/2006 |
| JP | 2010090288 A | 4/2010 |
| JP | 5318515 B2 | 10/2013 |
| KR | 10-0565870 A | 12/2006 |
| KR | 10-1335071 B1 | 12/2013 |
| KR | 10-2014-0018777 A | 2/2014 |
| KR | 10-1523066 B1 | 5/2015 |
| KR | 10-2017-0020858 A | 2/2017 |
| KR | 10-2017-0048851 A | 5/2017 |

OTHER PUBLICATIONS

Machine translation of KR 2017-0048851, published May 10, 2017.*

* cited by examiner

*Primary Examiner* — Vickey Nerangis
(74) *Attorney, Agent, or Firm* — Dentons US LLP

(57) ABSTRACT

The present disclosure relates to an inorganic composite, a method for producing the same, and a rubber composition for tires including the same. The inorganic composite according to the present disclosure is easy to handle, thereby improving safety of operators and productivity. Moreover, the inorganic composite makes it possible to uniformly disperse the inorganic particles in a rubber composition and to enhance the reinforcing effect. The rubber composition including the inorganic composite can be suitably used for eco-friendly tires requiring high efficiency and high fuel efficiency characteristics.

12 Claims, 1 Drawing Sheet

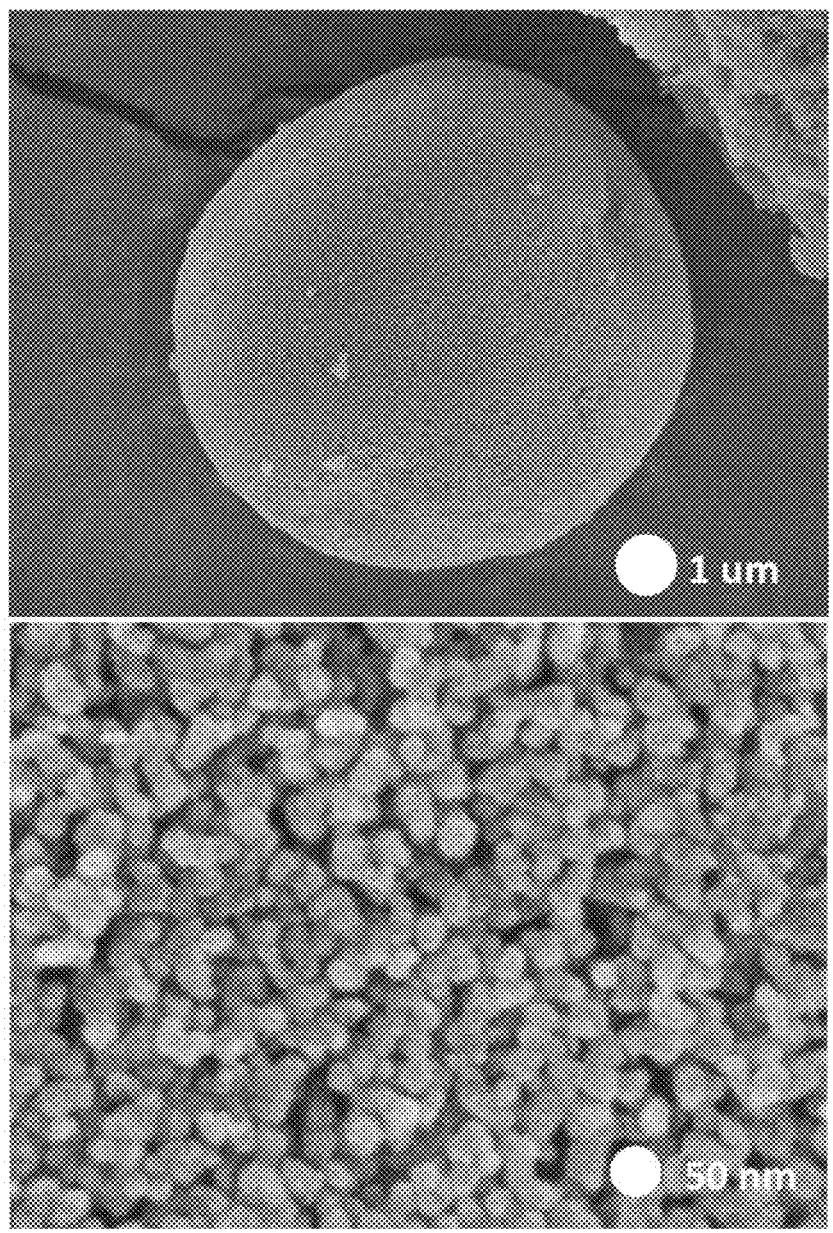

INORGANIC COMPOSITE FOR RUBBER REINFORCEMENT, METHOD FOR PREPARING THE SAME, AND RUBBER COMPOSITION FOR TIRES COMPRISING THE SAME

The present application is a National Phase entry pursuant to 35 U.S.C. § 371 of International Application No. PCT/KR2018/004298 filed on Apr. 12, 2018 and claims priority to and the benefit of Korean Patent Application No. 10-2017-0082777 filed on Jun. 29, 2017 with the Korean Intellectual Property Office, the disclosures of which are incorporated herein by reference in their entirety.

FIELD

The present disclosure relates to an inorganic composite for rubber reinforcement, a method for preparing the same, and a rubber composition for tires including the same.

BACKGROUND

As concerns about global warming and environmental problems spread, environment-friendly concepts of increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so abrasion resistance is deteriorated. In order to compensate for this, it is known that highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good diversity of properties (mechanical strength, rolling resistance and abrasion resistance). It is known that alumina, clay, kaolin, or the like can be used as a rubber reinforcing additive as an eco-friendly tire material by lowering rolling resistance. However, such rubber reinforcing additives have a problem that the dispersibility decreases due to formation of strong aggregates and the like, resulting in problems such as deterioration of mechanical strength.

SUMMARY

The present disclosure provides an inorganic composite for rubber reinforcement exhibiting excellent dispersibility and improved reinforcing effect in a rubber composition.

The present disclosure also provides a method for preparing the inorganic composite for rubber reinforcement.

The present disclosure further provides a rubber composition for tires including the inorganic composite for rubber reinforcement.

According to the present disclosure, an inorganic composite for rubber reinforcement, including secondary particles formed by agglomeration of silica primary particles and amorphous aluminosilicate primary particles having a composition represented by Chemical Formula 1, is provided:

$$M_{x/n}[(AlO_2)_x(SiO_2)_y]\cdot m(H_2O) \qquad \text{[Chemical Formula 1]}$$

wherein, in Chemical Formula 1,

M is an element selected from the group consisting of Li, Na, K, Rb, Cs, Be, and Fr, or ions thereof;

$x>0$, $y>$, $n>0$, and $m\geq0$;

$1.0\leq y/x\leq10.0$; and $0.01\leq x/n\leq1.2$.

According to the present disclosure, a method for preparing the inorganic composite for rubber reinforcement is provided, wherein the method includes the steps of:

preparing an aqueous solution in which silica primary particles and amorphous aluminosilicate primary particles having a composition represented by Chemical Formula 1 are dispersed; and spray-drying the aqueous solution at a spraying rate of 0.1 to 0.5 L/h at a temperature of 150 to 250° C. to form secondary particles in which the silica primary particles and the amorphous aluminosilicate primary particles are agglomerated.

In addition, a rubber composition for tires including the inorganic composite for rubber reinforcement and at least one diene elastomer is provided.

BRIEF DESCRIPTION OF THE DRAWING

FIG. 1 is a SEM image of secondary particles according to Example 3.

DETAILED DESCRIPTION

Hereinafter, the inorganic composite for rubber reinforcement, the method for preparing the same, and the rubber composition for tires including the same according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

In this disclosure, secondary particles refer to agglomerates of primary particles, which are minimum unit particles, by intermolecular attraction or the like. The secondary particles may be formed by agglomerating one type of primary particles, and may be formed by agglomerating a plurality of types of primary particles in a mixed state at an arbitrary ratio.

For example, FIG. 1 is a scanning electron microscopy (SEM) image of the secondary particles according to Example 3 of the present disclosure. Referring to FIG. 1, the secondary particles are micron-sized spherical particles in which nanometer-scale silica primary particles and aluminosilicate primary particles are mixed and agglomerated at an arbitrary ratio.

I. Inorganic Composite for Rubber Reinforcement

According to an embodiment of the present disclosure, an inorganic composite for rubber reinforcement is provided, wherein the composite includes secondary particles formed by agglomeration of silica primary particles and amorphous aluminosilicate primary particles having a composition represented by Chemical Formula 1:

[Chemical Formula 1]

$M_{x/n}[(AlO_2)_x(SiO_2)_y]\cdot m(H_2O)$ wherein, in Chemical Formula 1,

M is an element selected from the group consisting of Li, Na, K, Rb, Cs, Be, and Fr, or ions thereof;

x>0, y>0, n>0, and m≥0;

1.0≤y/x≤10.0; and 0.01≤x/n≤1.2.

As a result of studies by the present inventors, it was confirmed that when secondary particles including silica primary particles and amorphous aluminosilicate primary particles are applied to a rubber composition as a rubber reinforcing material, it is possible to uniformly disperse the inorganic particles and enhance the reinforcing effect.

In general, when inorganic particles are added as a rubber reinforcing material, dispersibility of the inorganic particles is deteriorated due to strong attraction between the inorganic particles, so the inorganic particles are unevenly distributed in a specific region in the rubber composition. Therefore, it is difficult to expect sufficient reinforcing effect.

In particular, a non-uniform distribution pattern of the inorganic particles in the rubber composition can be worsened by adding a plurality of different inorganic particles. For example, when the silica primary particles and aluminosilicate primary particles are respectively added as a rubber reinforcing material, the rubber composition has non-uniform distribution patterns in which a region mainly containing agglomerates of the silica primary particles and a region mainly containing agglomerates of the aluminosilicate primary particles are formed due to strong attraction between the particles of the same material.

The inorganic composite for rubber reinforcement according to an embodiment of the present disclosure includes micron-sized secondary particles formed by agglomeration of particles of different materials, such as silica primary particles and amorphous aluminosilicate primary particles.

This type of inorganic composite for rubber reinforcement is easier to handle and less dusty than nanometer-scale inorganic particles such as silica primary particles and aluminosilicate primary particles, thereby improving safety of operators and productivity.

In particular, when the inorganic composite for rubber reinforcement is added to the rubber composition and mixed, it can be easily broken into nanometer-scale primary particles, and the silica primary particles and the aluminosilicate primary particles can be uniformly dispersed in the rubber composition.

That is, in contrast to the known techniques of adding silica primary particles, aluminosilicate primary particles, or a mixture thereof as a rubber reinforcing material, the present disclosure provides the secondary particles formed by agglomeration of silica primary particles and aluminosilicate primary particles as a rubber reinforcing material, thereby facilitating more uniform distribution of the inorganic particles in the rubber composition and enhancing the reinforcing effect, while also being easy to handle.

The inorganic composite for rubber reinforcement according to the present disclosure includes the secondary particles formed by agglomeration of silica primary particles and amorphous aluminosilicate primary particles having a composition represented by Chemical Formula 1.

The secondary particles are agglomerates in which the silica primary particles and the amorphous aluminosilicate primary particles are physically agglomerated at an arbitrary ratio.

In the inorganic composite for rubber reinforcement, the silica ($SiO_2$) primary particles together with the amorphous aluminosilicate primary particles constitute the secondary particles.

The silica primary particles may have a particle diameter of about tens of nanometers to tens of micrometers. The average primary particle diameter of the silica primary particles is preferably 10 to 100 nm, which may be advantageous for manifesting all the properties according to the present disclosure.

Specifically, the number average primary particle diameter of the silica primary particles is 10 nm or more, 15 nm or more, or 20 nm or more, and 100 nm or less, 80 nm or less, 60 nm or less, 50 nm or less, or 25 nm or less.

The silica primary particles are characterized in that a Brunauer-Emmett-Teller surface area ($S_{BET}$) is 100 to 250 $m^2/g$ and an external specific surface area ($S_{EXT}$) is 100 to 200 $m^2/g$ according to an analysis of nitrogen adsorption/desorption, which may be advantageous for manifesting all the properties according to the present disclosure.

Specifically, the silica primary particles may have the $S_{BET}$ of 100 $m^2/g$ or more, 110 $m^2/g$ or more, 120 $m^2/g$ or more, 130 $m^2/g$ or more, 140 $m^2/g$ or more, or 150 $m^2/g$ or more, and 250 $m^2/g$ or less, 200 $m^2/g$ or less, 190 $m^2/g$ or less, 180 $m^2/g$ or less, or 170 $m^2/g$ or less.

Further, the silica primary particles may have the $S_{EXT}$ of 100 $m^2/g$ or more, 110 $m^2/g$ or more, 120 $m^2/g$ or more, 130 $m^2/g$ or more, or 140 $m^2/g$ or more, and 200 $m^2/g$ or less, 180 $m^2/g$ or less, 160 $m^2/g$ or less, or 150 $m^2/g$ or less.

More preferably, the silica primary particles have a ratio ($S_{EXT}/S_{BET}$) of the $S_{EXT}$ to the $S_{BET}$ of 0.8 to 1.0, which may be advantageous for manifesting all the properties according to the present disclosure. Specifically, the $S_{EXT}/S_{BET}$ is preferably 0.80 or more, 0.81 or more, 0.82 or more, 0.83 or more, 0.84 or more, or 0.85 or more, and 1.0 or less, 0.99 or less, 0.95 or less, 0.90 or less, or 0.88 or less.

Also, it is preferable that the content of micropores in the silica primary particles used as the reinforcing material for rubber is minimized. This is because the micropores act as defects and can deteriorate the physical properties of the reinforcing material for rubber.

According to the present disclosure, the silica primary particles are characterized in that a volume of micropores ($V_{micro}$) having a pore size of less than 2 nm calculated from the $S_{BET}$ by a t-plot method is less than 0.05 $cm^3/g$, which can exhibit excellent mechanical properties as a reinforcing material for rubber. Specifically, the $V_{micro}$ of the silica primary particles is preferably 0.05 $cm^3/g$ or less, 0.025 $cm^3/g$ or less, 0.020 $cm^3/g$ or less, 0.015 $cm^3/g$ or less, 0.010 $cm^3/g$ or less, or 0.009 $cm^3/g$ or less, and 0.005 $cm^3/g$ or more or 0.007 $cm^3/g$ or more.

In the inorganic composite for rubber reinforcement, the aluminosilicate primary particles together with the silica primary particles constitute the secondary particles.

The aluminosilicate primary particles are amorphous solids.

In the amorphous aluminosilicate primary particles, "amorphous" may refer to a full width at half maximum (FWHM) in a 2θ range of 20° to 37° in a data plot obtained by X-ray diffraction (XRD) of 3° to 8.5°.

Preferably, the full width at half maximum (FWHM) is 3° or more, 3.5° or more, 4.00 or more, 4.5° or more, 5.0° or more, 5.5° or more, or 6.0° or more. In addition, preferably, the FWHM is 8.5° or less, 8.0° or less, 7.5° or less, or 7.0° or less.

The full width at half maximum (FWHM) is a numerical value of a peak width at half of the maximum peak intensity in the 2θ range of 20° to 37° obtained by X-ray diffraction of the aluminosilicate primary particles.

The unit of the full width at half maximum (FWHM) can be expressed in degrees (°) which is the unit of 2θ. Compounds having high crystallinity may have a small FWHM value.

In addition, the amorphous aluminosilicate primary particles according to the embodiment of the present disclosure are characterized in that a maximum peak intensity (Imax) is in a 2θ range of 26° to 31° in a data plot obtained by X-ray diffraction (XRD).

Preferably, the maximum peak intensity (Imax) is in a 2θ range of 26° or more, 27° or more, or 28° or more. In addition, preferably, the maximum peak intensity (Imax) is in a 2θ range of 31° or less, 30.5° or less, or 30° or less.

For reference, amorphous silica shows Imax in a 2θ range of 20° to 25° and amorphous alumina shows Imax in a 2θ range of 30° to 40°.

The amorphous aluminosilicate primary particles have a composition of Chemical Formula 1:

$$M_{x/n}[(AlO_2)_x(SiO_2)_y]\cdot m(H_2O)$$ [Chemical Formula 1]

wherein, in Chemical Formula 1,

M is an element selected from the group consisting of Li, Na, K, Rb, Cs, Be, and Fr, or ions thereof;

$x>0$, $y>0$, $n>0$, and $m\geq 0$;

$1.0 \leq y/x \leq 10.0$; and $0.01 \leq x/n \leq 1.2$.

The amorphous aluminosilicate primary particles contain a metal element (M) or ions thereof and an alkali metal or ions thereof, and satisfy a composition of $1.0 \leq y/x \leq 10.0$ and $0.01 \leq x/n \leq 1.2$.

Specifically, in Chemical Formula 1, y/x is 1.0 or more, 1.15 or more, 1.3 or more, or 1.45 or more, and 10.0 or less, 7.5 or less, 5.0 or less, 4.5 or less, 4.0 or less, 3.5 or less, 3.0 or less, 2.5 or less, or 2.0 or less, which may be advantageous for manifesting all of the properties according to the present disclosure.

Specifically, in Chemical Formula 1, x/n is 0.01 or more, 0.05 or more, 0.1 or more, 0.5 or more, 0.55 or more, 0.6 or more, 0.65 or more, 0.7 or more, 0.75 or more, or 0.8 or more, and 1.2 or less or 1.15 or less, which may be advantageous for manifesting all of the properties according to the present disclosure.

An average primary particle diameter of the amorphous aluminosilicate primary particles is 10 to 50 nm, which may be advantageous for manifesting all the properties according to the present disclosure. Specifically, the number average primary particle diameter of the amorphous aluminosilicate primary particles is 10 nm or more, 15 nm or more, or 20 nm or more, and 50 nm or less, 40 nm or less, 30 nm or less, or 25 nm or less.

In general, the smaller the particle diameter of the reinforcing material for rubber, the better the reinforcing effect. However, the smaller the particle diameter, the more easily the agglomeration phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

In addition, the amorphous aluminosilicate primary particles are characterized in that a Brunauer-Emmett-Teller surface area ($S_{BET}$) is 80 to 250 m²/g and an external specific surface area ($S_{EXT}$) is 60 to 200 m²/g according to an analysis of nitrogen adsorption/desorption, which may be advantageous for manifesting all the properties according to the present disclosure.

Specifically, the amorphous aluminosilicate primary particles may have the $S_{BET}$ of 80 m²/g or more, 90 m²/g or more, 100 m²/g or more, 110 m²/g or more, or 120 m²/g or more, and 250 m²/g or less, 200 m²/g or less, 180 m²/g or less, 170 m²/g or less, 160 m²/g or less, 150 m²/g or less, or 130 m²/g or less.

Further, the amorphous aluminosilicate primary particles may have the $S_{EXT}$ of 60 m²/g or more, 70 m²/g or more, 80 m²/g or more, 90 m²/g or more, 100 m²/g or more, or 110 m²/g or more, and 200 m²/g or less, 180 m²/g or less, 160 m²/g or less, 140 m²/g or less, or 120 m²/g or less.

More preferably, the amorphous aluminosilicate primary particles may have a ratio ($S_{EXT}/S_{BET}$) of the $S_{EXT}$ to the $S_{BET}$ of 0.8 to 1.0, which may be advantageous for manifesting all the properties according to the present disclosure. Specifically, the $S_{EXT}/S_{BET}$ is preferably 0.80 or more, 0.82 or more, 0.84 or more, 0.86 or more, 0.88 or more, or 0.90 or more, and 1.0 or less, 0.99 or less, or 0.95 or less.

Also, it is preferable that the content of micropores in the amorphous aluminosilicate primary particles used as the reinforcing material for rubber is minimized. This is because the micropores act as defects and can deteriorate the physical properties of the reinforcing material for rubber.

According to an embodiment of the present disclosure, the amorphous aluminosilicate primary particles are characterized in that a volume of micropores ($V_{micro}$) having a pore size of less than 2 nm calculated from the $S_{BET}$ by a t-plot method is less than 0.05 cm³/g, which can exhibit excellent mechanical properties as a reinforcing material for rubber. Specifically, the $V_{micro}$ of the amorphous aluminosilicate primary particles is preferably 0.05 cm³/g or less, 0.025 cm³/g or less, 0.020 cm³/g or less, 0.015 cm³/g or less, 0.010 cm³/g or less, or 0.005 cm³/g or less, and 0.001 cm³/g or more or 0.003 cm³/g or more.

In addition, the amorphous aluminosilicate primary particles may have a particle size distribution which shows a volume average particle diameter ($D_{mean}$) of 1 to 25 μm, a geometric standard deviation of 1 to 20 μm, and a 90% cumulative particle diameter ($D_{90}$) of 1 to 100 μm, when measured using distilled water.

Specifically, the amorphous aluminosilicate primary particles may have a volume average particle diameter ($D_{mean}$) of 1 μm or more, 2.5 μm or more, 5 μm or more, or 7.5 μm or more, and 25 μm or less, 20 μm or less, or 15 μm or less, when measured using distilled water.

The amorphous aluminosilicate primary particles may have a geometric standard deviation of 1 μm or more, 2.5 μm or more, or 5 μm or more, and 20 μm or less, 15 μm or less, or 10 μm or less, when measured using distilled water.

The amorphous aluminosilicate primary particles may have a 90% cumulative particle diameter ($D_{90}$) of 1 μm or more, 5 μm or more, or 10 μm or more, and 100 μm or less, 50 μm or less, 25 μm or less, or 20 μm or less, when measured using distilled water.

According to an embodiment of the present disclosure, the secondary particles may be agglomerates in which 65 to 95 wt % of the silica primary particles and 5 to 35 wt % of the amorphous aluminosilicate primary particles are agglomerated in a mixed state.

Specifically, the silica primary particles are preferably included in an amount of 95 wt % or less, 90 wt % or less, or 85 wt % or less, and 65 wt % or more, or 70 wt % or more based on a total weight of the secondary particles.

In addition, the amorphous aluminosilicate primary particles are preferably included in an amount of 5 wt % or more, 10 wt % or more, or 15 wt % or more, and 35 wt % or less or 30 wt % or less based on a total weight of the secondary particles.

Since the silica primary particles tend to agglomerate strongly between the particles compared to the aluminosilicate primary particles, if the silica primary particles are added as a rubber reinforcement alone, it may exhibit poor dispersibility (a non-uniform distribution pattern).

However, in the inorganic composite for rubber reinforcement, the silica primary particles are added to a rubber composition in the form of secondary particles together with the aluminosilicate primary particles, and are decomposed into silica primary particles and aluminosilicate primary particles and dispersed upon rubber compounding. Accordingly, the non-uniform distribution pattern of the silica primary particles in the rubber composition can be minimized as compared with the case where the silica primary particles are added alone.

The inorganic composite for rubber reinforcement can exhibit an improved dispersibility of the inorganic particles in the rubber composition, and the improvement in dispersibility can lead to an improvement in viscoelastic characteristics of the rubber composition.

Therefore, it is preferable that the amorphous aluminosilicate primary particles are included in an amount of 5 wt % or more based on a total weight of the inorganic composite for rubber reinforcement.

However, since the amorphous aluminosilicate primary particles have lower wear resistance than the silica primary particles, when the inorganic composite for rubber reinforcement includes the amorphous aluminosilicate primary particles in an excessive amount, the rubber reinforcing effect (particularly, the effect of improving wear resistance) of the inorganic composite for rubber reinforcement may not be high.

Therefore, it is preferable that the amorphous aluminosilicate primary particles are included in an amount of 35 wt % or less based on a total weight of the inorganic composite for rubber reinforcement.

That is, the secondary particles preferably include the silica primary particles and the amorphous aluminosilicate primary particles in a mixed state within the above weight range, in order to improve the wear resistance and viscoelastic characteristics of the rubber composition.

The secondary particles are micron-sized particles formed by agglomeration of the silica primary particles and the amorphous aluminosilicate primary particles through physical bonding, and may have an average particle diameter of 1 to 100 μm.

Specifically, the average particle diameter of the secondary particles is preferably 1 μm or more, 2 μm or more, or 5 μm or more, and 100 μm or less, 75 μm or less, 50 μm or less, or 25 μm or less.

The secondary particles are formed by agglomeration of the silica primary particles and the amorphous aluminosilicate primary particles. When the inorganic composite for rubber reinforcement is added to the rubber composition and mixed, the silica primary particles and the aluminosilicate primary particles forming the secondary particles are easily broken into nano-scale primary particles and can be uniformly dispersed in the rubber composition.

Thus, the secondary particles are not necessarily formulated to a certain range of granularity or do not necessarily have a specific pore structure. However, as described above, in order to improve safety of operators and productivity compared with the nano-scale primary particles, the average particle diameter of the secondary particles is preferably 1 μm or more.

If the particle diameter of the secondary particles is too large, the secondary particles may not be broken sufficiently during mixing with the rubber composition, and thus the dispersibility may be lowered. Therefore, it is preferable that the average particle diameter of the secondary particles is 100 μm or less.

The size of the primary particles, the size of the secondary particles, and the agglomeration state of the secondary particles can be confirmed by observation and analysis using TEM (transmission electron microscopy), SEM (scanning electron microscopy), FE-STEM (field emission scanning transmission electron microscopy), EDX (energy dispersive x-ray detection), XPS (x-ray photoelectron spectroscopy), and the like.

II. Method for Preparinq Inorganic Composite for Rubber Reinforcement

Another embodiment of the present disclosure provides a method for preparing the inorganic composite for rubber reinforcement, including the steps of:

preparing an aqueous solution in which silica primary particles and amorphous aluminosilicate primary particles having a composition represented by Chemical Formula 1 are dispersed; and spray-drying the aqueous solution at a spraying rate of 0.1 to 0.5 L/h at a temperature of 150 to 250° C. to form secondary particles in which the silica primary particles and the amorphous aluminosilicate primary particles are agglomerated.

As a result of studies by the present inventors, it was confirmed that the inorganic composite for rubber reinforcement including the above-described secondary particles can be prepared by the spray-drying method under the above conditions without any additional dispersant.

The inorganic composite for rubber reinforcement may be prepared by spray-drying the aqueous solution in which the silica primary particles and the amorphous aluminosilicate primary particles are dispersed at a high temperature.

The aqueous solution is prepared by i) mixing an aqueous solution in which the silica primary particles are dispersed and an aqueous solution in which the amorphous aluminosilicate primary particles are dispersed, or ii) a method in which the silica primary particles and the amorphous aluminosilicate primary particles are added to distilled water and dispersed.

The particle size and pore characteristics of the silica primary particles and the amorphous aluminosilicate primary particles are replaced with those described in "I. The inorganic composite for rubber reinforcement".

According to an embodiment of the present disclosure, the aqueous solution may include 65 to 95 wt % of the silica primary particles and 5 to 35 wt % of the amorphous aluminosilicate primary particles in solid content.

Specifically, the aqueous solution preferably includes 95 wt % or less, 90 wt % or less, or 85 wt % or less, and 65 wt % or more or 70 wt % or more of the silica in solid content.

Further, the aqueous solution preferably includes 5 wt % or more, 10 wt % or more, or 15 wt % or more, and 35 wt % or less or 30 wt % or less of the amorphous aluminosilicate primary particles in solid content.

According to an embodiment of the present disclosure, the amorphous aluminosilicate primary particles having the composition of Chemical Formula 1 may be prepared by a method including the steps of:

[i] adding silicon sources, aluminum sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at a low temperature (for example, from room temperature to 90° C.) and atmospheric pressure for 3 to 24 hours to cause an Al—O—Si polymerization reaction;

[iii] washing and drying the polymerized aluminosilicate; and

[iv] crushing the dried aluminosilicate to control particle size distribution thereof.

The amorphous aluminosilicate primary particles satisfying all of the above characteristics can be obtained by controlling the type of reactants, the molar ratio of reactants, and the reaction conditions to be applied to the formation of the monomer unit in the method.

In the method, fumed silica, rice husks, colloidal silica, Celite, perlite, rice husk ash, silica fume, organosilane, clay, minerals, metakaolin, calcined clay, active clay, fly ash, slag, pozzolan, incinerated utility waste, industrial by-products, glass powder, red mud, or the like may be used as the silicon sources.

In addition, alumina, aluminate, aluminum salts, organic aluminoxane, perlite, clay, minerals, metakaolin, calcined clay, active clay, fly ash, slag, pozzolan, incinerated utility waste, industrial byproducts, glass powder, red mud, or the like may be used as the aluminum sources.

Meanwhile, the step of spray-drying the aqueous solution in which the silica primary particles and the amorphous aluminosilicate primary particles are dispersed may be performed by pumping at a spraying rate of 0.1 to 0.5 L/h at a temperature of 150 to 250° C.

The step of spray-drying the aqueous solution may be carried out using a suitable spray dryer. Configurations of the spray dryer are not particularly limited. The spray dryer may be operated by the contact of a droplet such as co-current flow, counter-current flow, or combined mode (mixed flow), and a dry gas using a nozzle such as a two fluid nozzle, a pressure nozzle, a rotary disk atomizer, or an ultrasonic nozzle.

At this time, in order to form the secondary particles in which the silica primary particles and the amorphous aluminosilicate primary particles are agglomerated, it is preferable that the spray-drying step is performed at a temperature of 150° C. or more or 200° C. or more, and 250° C. or less or 225° C. or less.

The spraying rate of the aqueous solution may be determined in consideration of the content of the inorganic particles in the aqueous solution, the temperature at which the spray-drying is performed, the size of the nozzle through which the aqueous solution is sprayed, and the drying rate by spray-drying. Preferably, the aqueous solution may be pumped at a spraying rate of 0.1 L/h or more, 0.15 L/h or more, or 0.2 L/h or more, and 0.5 L/h or less, 0.4 L/h or less, or 0.3 L/h or less.

By performing the above steps, the inorganic composite for rubber reinforcement including secondary particles formed by agglomeration of the silica primary particles and the amorphous aluminosilicate primary particles can be prepared.

Subsequently, the inorganic composite may be washed and dried by a conventional method, as needed.

III. Rubber Composition for Tires

According to another embodiment of the present disclosure, a rubber composition for tires including the inorganic composite for rubber reinforcement is provided.

When the inorganic composite for rubber reinforcement is added to the rubber composition and mixed, it can be easily broken into nano-scale primary particles, and the silica primary particles and the aluminosilicate primary particles can be uniformly dispersed in the rubber composition.

Further, since the rubber composition for tires includes the inorganic composite for rubber reinforcement including the secondary particles, it can exhibit improved viscoelastic properties while having excellent wear resistance.

The rubber composition for tires may include a general diene elastomer without any particular limitation, together with the inorganic composite for rubber reinforcement.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

In addition, plasticizers, pigments, antioxidants, ozone deterioration inhibitors, vulcanization accelerators, and the like which are commonly used in the tire industry may be added to the rubber composition for tires.

The inorganic composite for rubber reinforcement according to the present disclosure is easy to handle, thereby improving safety of operators and productivity. Moreover, the inorganic composite makes it possible to uniformly disperse the inorganic particles in a rubber composition and to enhance the reinforcing effect. The rubber composition including the inorganic composite for rubber reinforcement can be suitably used for eco-friendly tires requiring high efficiency and high fuel efficiency characteristics.

EXAMPLES

Hereinafter, preferred examples are provided for better understanding. However, these examples are for illustrative purposes only, and the invention is not intended to be limited by these examples.

Example 1

(Preparation of Amorphous Aluminosilicate Particles)

23 g of KOH (Daejung Chemicals & Metals) was dissolved in 62 ml of distilled water (DW). 15 g of calcined kaolin was added thereto, followed by stirring at 600 rpm for 30 minutes using an overhead stirrer. 27 g of colloidal silica (Ludox HS 30 wt %; Sigma-Aldrich) was added thereto, and further stirred for 30 minutes.

This was cured at 70° C. for 4 hours.

The cured solid product was added into distilled water at 90° C., and then washed to about pH 7 by stirring and centrifugation for 12 hours.

The washed solid product was dried in an oven at 70° C. for 24 hours to finally obtain aluminosilicate particles (primary particle diameter of 20 nm).

Example 2

Commercial silica primary particles (Ultrasil 7000GR, Evonic, average primary particle diameter of 20 nm) were prepared.

Example 3

15 g of the aluminosilicate primary particles of Example 1 and 85 g of the silica primary particles of Example 2 were added to 1 L of distilled water and dispersed to prepare an aqueous solution.

The aqueous solution was pumped at a spraying rate of 0.2 L/h to a spray dryer (Mini Spray Dryer B-290, BUCHI; two fluid nozzle, co-current flow) at a spraying room temperature that was adjusted to 200° C. to obtain secondary particles (average particle diameter of 6 Mm) in which the silica primary particles and the amorphous aluminosilicate primary particles were mixed and agglomerated.

Example 4

30 g of the aluminosilicate primary particles of Example 1 and 70 g of the silica primary particles of Example 2 were added to 1 L of distilled water and dispersed to prepare an aqueous solution.

The aqueous solution was pumped at a spraying rate of 0.2 L/h to a spray dryer (Mini Spray Dryer B-290, BUCHI; two fluid nozzle, co-current flow) at a spraying room temperature that was adjusted to 200° C. to obtain secondary particles (average particle diameter of 6 µm) in which the silica primary particles and the amorphous aluminosilicate primary particles were mixed and agglomerated.

Example 5

100 g of the aluminosilicate primary particles of Example 1 were added to 1 L of distilled water and dispersed to prepare an aqueous solution.

The aqueous solution was pumped at a spraying rate of 0.2 L/h to a spray dryer (Mini Spray Dryer B-290, BUCHI; two fluid nozzle, co-current flow) at a spraying room temperature that was adjusted to 200° C. to obtain secondary particles (average particle diameter of 6 Mm) in which the aluminosilicate primary particles were agglomerated.

Example 6

137.5 phr (parts per hundred rubber) of a diene elastomer mixture (SSBR 3626, LG Chemical), 70 phr of the secondary particles according to Example 3 as a reinforcing material, 11.2 phr of a polysiloxane-based coupling agent, 3 phr of zinc oxide (ZnO), and 2 phr of citric acid were added to a closed mixer. This was mixed at 150° C. for 5 minutes, and then 10.25 phr of other additives (antioxidant, emulsifier, vulcanization accelerator, wax, etc.) were added and mixed for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

Example 7

A rubber molded product in the form of a sheet was obtained in the same manner as in Example 6, except that 70 phr of the secondary particles according to Example 4 were added instead of the secondary particles according to Example 3 as a reinforcing material.

Comparative Example 1

A rubber molded product in the form of a sheet was obtained in the same manner as in Example 6, except that 70 phr of the silica primary particles according to Example 2 were added instead of the secondary particles according to Example 3 as a reinforcing material.

Comparative Example 2

A rubber molded product in the form of a sheet was obtained in the same manner as in Example 6, except that 10.5 phr of the aluminosilicate primary particles according to Example 1 and 59.5 phr of the silica primary particles according to Example 2 were added instead of the secondary particles according to Example 3 as a reinforcing material.

Comparative Example 3

A rubber molded product in the form of a sheet was obtained in the same manner as in Example 6, except that 21 phr of the aluminosilicate primary particles according to Example 1 and 49 phr of the silica primary particles according to Example 2 were added instead of the secondary particles according to Example 3 as a reinforcing material.

Comparative Example 4

A rubber molded product in the form of a sheet was obtained in the same manner as in Example 6, except that 70 phr of the aluminosilicate primary particles according to Example 1 were added instead of the secondary particles according to Example 3 as a reinforcing material.

Comparative Example 5

A rubber molded product in the form of a sheet was obtained in the same manner as in Example 6, except that 70 phr of the spray-dried aluminosilicate secondary particles according to Example 5 were added instead of the secondary particles according to Example 3 as a reinforcing material.

Experimental Example 1

(1) A composition of the aluminosilicate primary particles according to Example 1 was confirmed using energy dispersive X-ray spectroscopy (EDS). As a result, it was confirmed that the aluminosilicate primary particles of Example 1 had a composition of y/x=1.6 and x/n=1.12 in Chemical Formula 1.

(2) An average particle diameter of the aluminosilicate primary particles according to Example 1 and the silica primary particles according to Example 2 was confirmed using scanning electron microscopy (SEM).

(3) Nitrogen adsorption/desorption performance of the particles according to Examples 1 and 2 was measured using a specific surface area analyzer (BEL Japan Inc., BELSORP_MAX). A BJH-plot method was applied to the nitrogen adsorption/desorption curve to obtain a Brunauer-Emmett-Teller surface area ($S_{BET}$) of the particles. Then, an external specific surface area ($S_{EXT}$) and a volume of micropores ($V_{micro}$) having a pore size of less than 2 nm were obtained by applying a t-plot method to the nitrogen adsorption/desorption curve.

TABLE 1

| | Primary particle diameter (nm) | $S_{BET}$ (m²/g) | $S_{EXT}$ (m²/g) | $S_{EXT}/S_{BET}$ | $V_{micro}$ (cm³/g) |
|---|---|---|---|---|---|
| Example 1 | 20 | 120 | 110 | 0.91 | 0.004 |
| Example 2 | 20 | 170 | 150 | 0.88 | 0.009 |

Experimental Example 2

X-ray diffraction analysis for the aluminosilicate primary particles according to Example 1 was carried out using an X-ray diffractometer (Bruker AXS D4-Endeavor XRD) under an applied voltage of 40 kV and an applied current of 40 mA.

The measured range of 2θ was 10° to 90°, and it was scanned at an interval of 0.05°. Herein, a 6 mm variable divergence slit was used as a slit, and a large PMMA holder (diameter=20 mm) was used to eliminate background noise due to the PMMA holder. Further, a full width at half maximum (FWHM) at a peak of about 29° which is the maximum peak in the 2θ range of 20° to 37° was calculated in the data plot obtained by X-ray diffraction (XRD).

TABLE 2

| | FWHM (°) | $I_{max}$ (°) | Crystal form |
|---|---|---|---|
| Example 1 | 6.745 | 29.2 | amorphous |

Experimental Example 3

An average particle diameter of the secondary particles according to Examples 3 and 4 was measured using scanning electron microscopy (SEM). The SEM image of the secondary particles according to Example 3 is shown in FIG. 1.

As a result, it was confirmed that the secondary particles according to Examples 3 and 4 are spherical agglomerates of about 6 μm, respectively.

Referring to the SEM image of FIG. 1, it was confirmed that the secondary particles of Example 3 are spherical particles in which the silica primary particles and the aluminosilicate primary particles are mixed and agglomerated. It was also confirmed that the secondary particles of Example 3 have inorganic particles of about 20 nm agglomerated on the surface of the particles without necking or growth. In addition, it was confirmed that homogeneous particles are formed without separation of the silica primary particles and aluminosilicate primary particles used in the preparation of the secondary particles.

Experimental Example 4

Tensile properties, wear resistance, and viscoelasticity of the rubber molded products according to Examples 6 to 7 and Comparative Examples 1 to 5 were measured in the following manner, and the results are shown in Table 3 below.

(1) Tensile Properties

Tensile stress at 300% (M300%), tensile stress at 100% (M100%), and tensile strength at yield (T.S.) were measured using a tensile property tester (Universal Test Machine 4204, Instron) in accordance with ASTM D412.

The M300% and T.S. were normalized based on the value of the rubber molded product of Comparative Example 1, and are shown in Table 3 below.

(2) Wear Resistance

Wear resistance (W.R.) was evaluated by measuring a relative volume loss index using an abrasion tester (manufactured by Bareiss GmbH) in accordance with DIN ISO 4649.

The wear resistance was calculated by the following equation for the rubber molded products of Examples 6 and 7 and Comparative Examples 2 to 5, after determining the rubber molded product of Comparative Example 1 in which silica primary particles were added as a reinforcing material, as a reference material.

The wear resistance={[(relative volume loss of the rubber molded product of Comparative Example 1)−(relative volume loss of the target rubber molded product)]/[(relative volume loss of the rubber molded product of Comparative Example 1)×100]}+100

(3) Viscoelasticity

The dynamic loss factor (tan δ) was measured under a dynamic strain of 3% and a static strain of 3% using a viscoelasticity measurement apparatus (DMTS 500N, Gabo, Germany). The measured values were normalized based on the value of the rubber molded product of Comparative Example 1, and are shown in Table 3 below.

For reference, the dynamic loss factor at 0° C. (tan δ @0° C.) is related to a wet grip property of tires. It is known that the higher the value, the better the wet grip property. In addition, the dynamic loss factor at 60° C. (tan δ @60° C.) is related to rolling resistance of tires, and it is known that the lower the value, the better the rolling resistance.

TABLE 3

| | M300% index | M300%/ M100% | T.S. index | W.R. index | tan δ @0° C. index | tan δ @60° C. index |
|---|---|---|---|---|---|---|
| Example 6 | 106 | 5.00 | 114 | 98 | 113 | 105 |
| Example 7 | 103 | 4.86 | 104 | 98 | 106 | 111 |
| Comparative Example 1 | 100 | 4.72 | 100 | 100 | 100 | 100 |
| Comparative Example 2 | 100 | 5.00 | 103 | 100 | 101 | 106 |
| Comparative Example 3 | 100 | 4.77 | 104 | 93 | 103 | 110 |
| Comparative Example 4 | 101 | 4.56 | 83 | 85 | 111 | 131 |
| Comparative Example 5 | 109 | 5.00 | 91 | 88 | 118 | 125 |

Referring to Table 3, it was confirmed that the rubber molded products according to Examples 6 and 7 exhibited improved tensile properties and wet grip characteristics while having wear resistance similar to that of Comparative Example 1.

In addition, the rubber molded products according to Examples 6 and 7 exhibited improved tensile properties, wear resistance, and wet grip characteristics compared with those of Comparative Examples 2 and 3 in which a mixture of silica and aluminosilicate was added as a reinforcing material.

The rubber molded products of Comparative Examples 4 and 5 exhibited low tensile strength, and poor wear resistance and rolling resistance.

In the manufacturing process of the rubber molded product of Examples 6 and 7 in which the secondary particles according to Examples 3 or 4 were applied as a reinforcing material, the amount of dust generated during the addition of the reinforcing material was small, so workability was improved, compared with the manufacturing process of the rubber molded product of Comparative Examples 1 to 5. In addition, in the manufacturing process of the rubber molded product of Examples 6 and 7, loss of the reinforcing material due to dust generation during the addition of the reinforcing material was minimized, and constant physical properties such as wear resistance and viscoelasticity were secured.

The invention claimed is:

1. An inorganic composite, comprising composite secondary particles formed by agglomeration of silica primary particles and amorphous aluminosilicate primary particles, wherein the amorphous aluminosilicate primary particles have a composition represented by the following Chemical Formula 1:

$$M_{x/n}[(AlO_2)_x(SiO_2)_y]\cdot m(H_2O)$$ [Chemical Formula 1]

wherein, in Chemical Formula 1,
M is an element selected from the group consisting of Li, Na, K, Rb, Cs, Be, and Fr, or ions thereof;
x>0, y>0, n>0, and m≥0;
1.0≤y/x≤10.0; and
0.01≤x/n≤1.2,
wherein the secondary particles comprise 65 to 95 wt % of the silica primary particles and 5 to 35 wt % of the amorphous aluminosilicate primary particles, and
wherein a volume of micropores having a pore size of less than 2 nm in the silica primary particles is 0.005 cm$^3$/g to 0.05 cm$^3$/g, and a volume of micropores having a pore size of less than 2 nm in the amorphous aluminosilicate primary particles is 0.001 cm$^3$/g to 0.05 cm$^3$/g.

2. The inorganic composite of claim 1,
wherein the silica primary particles have an average particle diameter of 10 to 100 nm, a Brunauer-Emmett-Teller surface area ($S_{BET}$) of 100 to 250 m$^2$/g, and an external specific surface area ($S_{EXT}$) of 100 to 200 m$^2$/g according to an analysis of nitrogen adsorption/desorption.

3. The inorganic composite of claim 1,
wherein the amorphous aluminosilicate primary particles have an average particle diameter of 10 to 50 nm, a Brunauer-Emmett-Teller surface area ($S_{BET}$) of 80 to 250 m$^2$/g, and an external specific surface area ($S_{EXT}$) of 60 to 200 m$^2$/g according to an analysis of nitrogen adsorption/desorption.

4. The inorganic composite of claim 1,
wherein the silica primary particles and the amorphous aluminosilicate primary particles have a ratio ($S_{EXT}/S_{BET}$) of an external specific surface area ($S_{EXT}$) to a Bruner-Emmet-Teller surface area ($S_{BE}T$) according to an analysis of nitrogen adsorption/desorption that is 0.8 to 1.0, respectively.

5. The inorganic composite of claim 1,
wherein the silica primary particles and the amorphous aluminosilicate primary particles have a volume of micropores ($V_{micro}$) having a pore size of less than 2 nm calculated from a micro, Bruner-Emmet-Teller surface area ($S_{BET}$) according to an analysis of nitrogen adsorption/desorption by a t-plot method that is less than 0.05 cm$^3$/g.

6. The inorganic composite of claim 1,
wherein the secondary particles have an average particle diameter of 1 to 100 μm.

7. The inorganic composite of claim 1, a number average primary particle diameter of the silica primary particles is 20 nm or more and 25 nm or less, a number average primary particle diameter of the amorphous aluminosilicate primary particles is 20 nm or more and 25 nm or less.

8. The inorganic composite of claim 7, wherein the average particle diameter of the secondary particles is 25 μm or less.

9. A method for preparing the inorganic composite of claim 1, comprising:
preparing an aqueous solution in which the silica primary particles and the amorphous aluminosilicate primary particles are dispersed; and
spray-drying the aqueous solution at a spraying rate of 0.1 to 0.5 L/h at a temperature of 150 to 250° C. to form the secondary particles.

10. The method for preparing the inorganic composite of claim 9, wherein the aqueous solution comprises 65 to 95 wt % of the silica primary particles and 5 to 35 wt% of the amorphous aluminosilicate primary particles in solid content.

11. A rubber composition for tires comprising the inorganic composite of claim 1 and at least one diene elastomer.

12. The rubber composition for tires of claim 11,
wherein the diene elastomer is at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

* * * * *